(12) United States Patent
Johnson

(10) Patent No.: US 6,513,453 B1
(45) Date of Patent: Feb. 4, 2003

(54) METHOD FOR EXTRUDING POULTRY LITTER FOR THE MANUFACTURE OF FEED AND AQUATIC BAIT PRODUCTS

(76) Inventor: Leslie J Johnson, R.R. 1 Box 285, Monticello, MS (US) 39654

( * ) Notice: Subject to any disclaimer, the term of this patent is extended or adjusted under 35 U.S.C. 154(b) by 0 days.

(21) Appl. No.: 10/123,128

(22) Filed: Apr. 16, 2002

(51) Int. Cl.[7] ............................ A01K 61/00; A01B 4/12
(52) U.S. Cl. ........................ 119/212; 119/51.04; 426/55
(58) Field of Search ........................... 119/51.04, 51.01, 119/242, 212; 426/1, 55

(56) References Cited

U.S. PATENT DOCUMENTS

| | | | |
|---|---|---|---|
| 5,728,192 A | * | 3/1998 | Andrew, Jr. ................. 241/28 |
| 6,174,551 B1 | * | 1/2001 | Griffin et al. ................ 426/443 |
| 6,206,945 B1 | * | 3/2001 | Weiss et al. ................... 426/55 |
| 6,386,144 B1 | * | 5/2002 | Cathey ......................... 119/171 |

* cited by examiner

Primary Examiner—Charles T. Jordan
Assistant Examiner—Judith A. Nelson
(74) Attorney, Agent, or Firm—Michael I Kroll

(57) ABSTRACT

A method for extruding poultry litter into substantially cylindrically shaped plugs of various lengths for use as bait for assorted marine animals wherein all pathogens are destroyed to prevent damaging the environment and any organisms that might consume said processed bait product. Furthermore, fish or shellfish by-products and other materials may be combined with the poultry litter so as to enhance the effectiveness of the product.

9 Claims, 4 Drawing Sheets

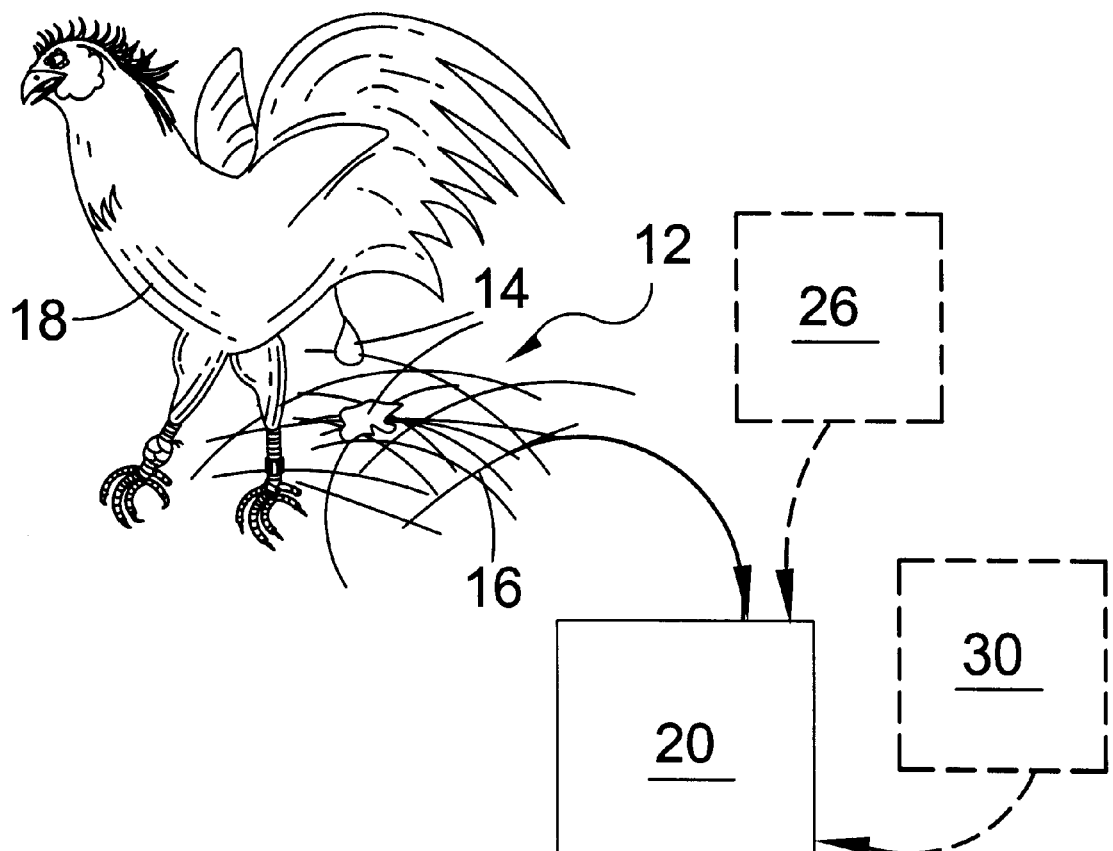
FIG. 1
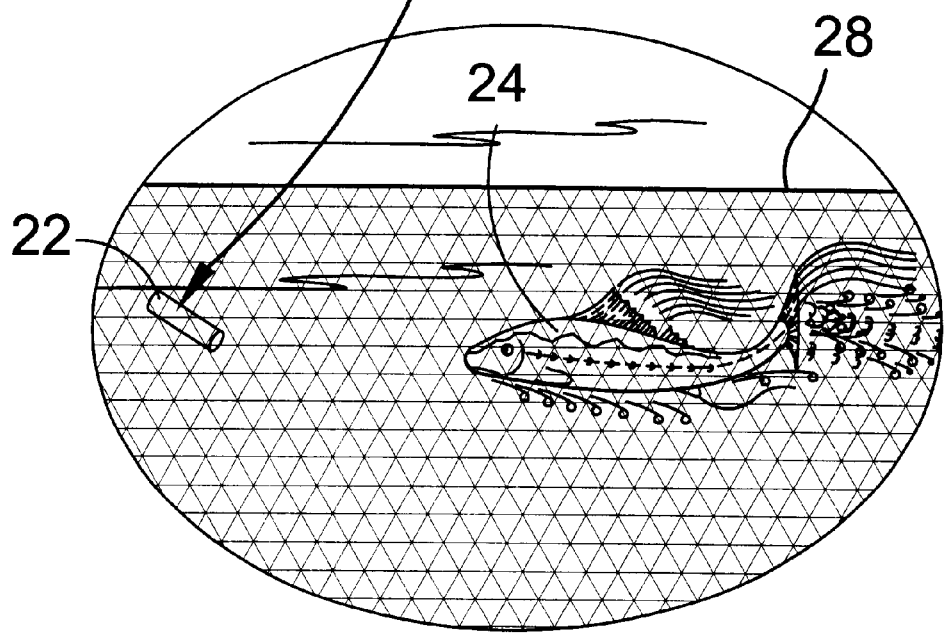

METHOD FOR EXTRUDING POULTRY LITTER FOR THE MANUFACTURE OF FEED AND AQUATIC BAIT PRODUCTS

BACKGROUND OF THE INVENTION

1. Field of the Invention

The present invention relates generally to bait products for marine life and, more specifically, to a method for manufacturing cylindrical plugs from poultry litter for use as bait for marine life. The poultry litter undergoes an extrusion process resulting in a plurality of substantially cylindrical high-density plugs of various lengths to be used as bait. Furthermore, the extrusion process kills all inherent pathogens thereby preventing the transmittal of said pathogens to humans that consume the marine life that eats the bait. Fish by-products may also be used to enhance the effectiveness of the bait plugs.

Poultry farms have long looked for productive, cost-effective ways to dispose of or utilize the waste resulting from the manure and bedding material that comprise the poultry litter that is produced during modern poultry production without contaminating the surrounding environment. Poultry farms generate tremendous amounts of poultry litter and the environmentally safe removal thereof can be costly, thus, much work and research has been done to find ways to turn this plentiful waste product into a valuable resource. The processing of poultry litter for a variety of uses such as fertilizer, fuel and feed has become common and is necessary to remove pathogens that are present in raw poultry litter that can spread diseases when handled, mixed with soil or introduced into the food chain.

The method of the present invention involves the initial placement of raw poultry litter into an extruder where pressure is applied thereto to force it through constrictions. Pressure and friction heat the litter to a temperature of at least 200 degrees Fahrenheit for a predetermined amount of time. The heat produced by the extrusion process destroys the inherent pathogens thereby rendering the resulting poultry litter product to be safe for introduction into the environment as fertilizer, burning for fuel, for marine bait or feed or for using as feed for livestock. The process of the present invention further provides a means for the pelletization of the processed poultry litter which is compressed and extruded through at least one tube thereby forming the exiting poultry litter into pellets with a diameter conforming to that of the tube and a length which varies as the exiting material breaks off. The present invention provides a method of preparing poultry litter for use as a marine bait or feed product that is biologically safe and will not introduce pathogens into the marine life that eats it or into the humans that consume the captured marine life and will not cause any damage to the aquatic environment in which it is used. Furthermore, the poultry litter of the present invention is heated to a specific temperature for a predetermined amount of time to assure that the resulting poultry litter is of a high density.

Certain fish or shellfish derivatives and/or animal or vegetable products may also be added to the raw poultry litter prior to processing to increase the appeal of the resulting poultry litter bait product to the targeted marine life. Talc may also be added to improve the performance of the extruder and add to the density of the material produced.

2. Description of the Prior Art

There are other poultry litter processing methods known in the art. While these poultry litter processing methods may be suitable for the purposes for which they were designed, they would not be as suitable for the purposes of the present invention, as hereinafter described.

SUMMARY OF THE PRESENT INVENTION

A primary object of the present invention is to provide a method for extruding poultry litter for use as bait for marine life.

Another object of the present invention is to provide a method for extruding poultry litter for use as bait for marine life wherein all pathogens are destroyed during processing.

Yet another object of the present invention is to provide a method for extruding poultry litter for use as bait for marine life wherein the poultry litter is heated to a temperature of no less than 200 degrees Fahrenheit for a predetermined duration during the extrusion process to destroy the inherent pathogens.

Still yet another object of the present invention is to provide a method for extruding poultry litter for use as bait for marine life wherein the temperature and duration that the poultry litter is processed determines the density of the resulting poultry feed bait product which must be extremely dense to maintain consistency when immersed, particularly when subjected to the erosive effect of tidal currents passing through the trap.

Yet another object of the present invention is to provide a method for extruding poultry litter for use as bait for marine life wherein fish by-products and/or animal or vegetable products are added to the raw poultry litter prior to or during the processing thereof.

A further object of the present invention is to provide a method for extruding poultry litter for use as bait for marine life that is simple to use.

One more object of the present invention is to provide a method and process for extruding poultry litter for use as bait for marine life that is inexpensive to manufacture.

Additional objects of the present invention will appear as the description proceeds.

The present invention overcomes the shortcomings of the prior art by providing a method for extruding poultry litter for use as bait for marine life. The resulting poultry litter bait product is pathogen free and extremely dense to maintain its consistency when submerged in liquid and subjected to the rigors of traveling through said fluid. Fish by-products and/or animal or vegetables may be added to the poultry litter prior to or during processing to enhance the effectiveness of the product.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which:

FIG. 1 is an illustrative view of the various stages of the poultry litter.

DESCRIPTION OF THE REFERENCED NUMERALS

Figure 2:
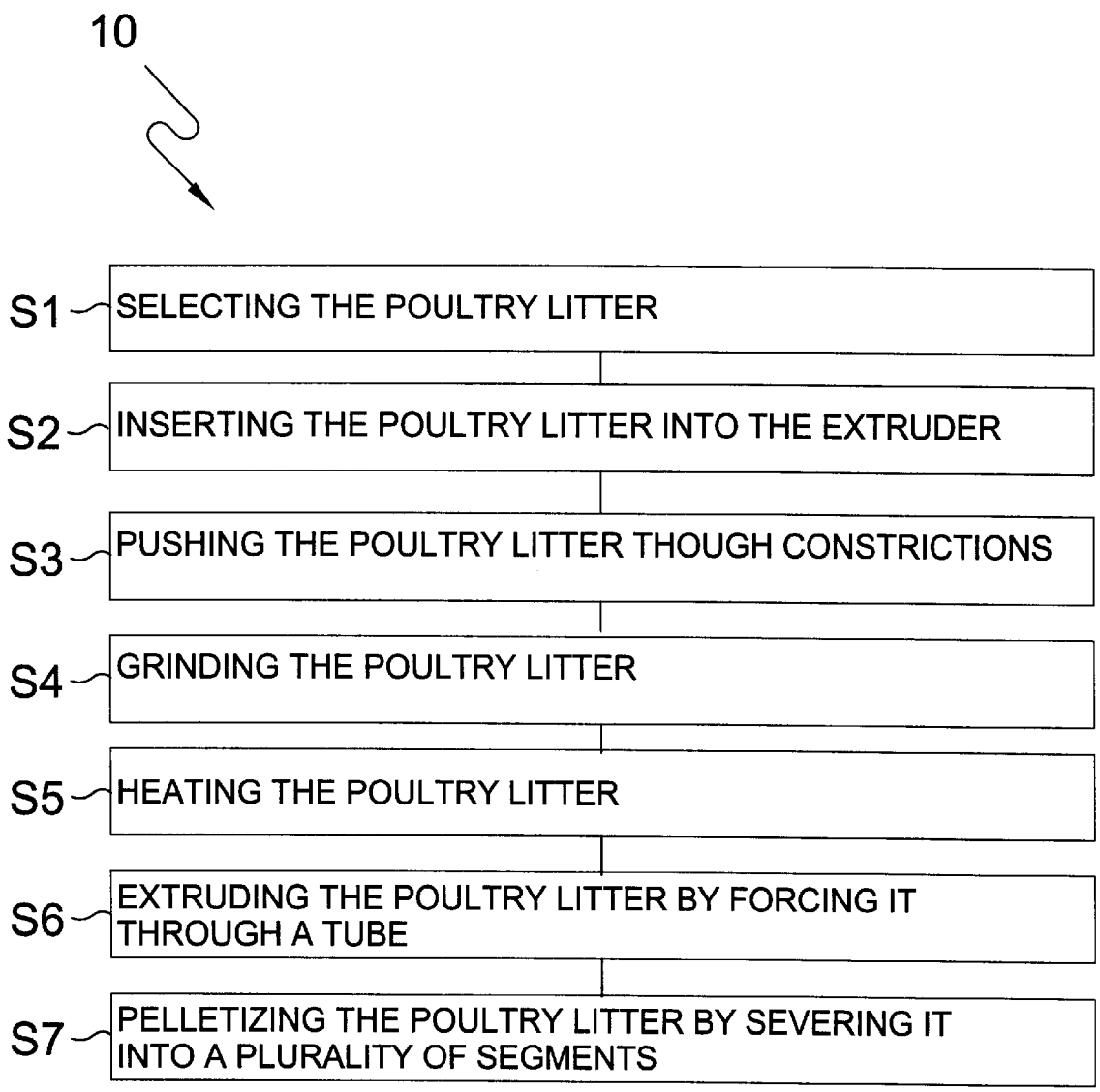
FIG. 2 is a flow chart of the method of the present invention.

Turning now descriptively to the drawings, in which similar reference characters denote similar elements throughout the several views, the Figures illustrate the method and process for extruding poultry litter for use as bait for marine life. With regard to the reference numerals used, the following numbering is used throughout the various drawing figures.

- 10 method for extruding pure poultry litter for the manufacture of aquatic bait
- 12 poultry litter
- 14 poultry manure
- 16 bedding
- 18 chicken
- 20 extruder
- 22 poultry litter bait plug
- 24 fish
- 26 fish by-products
- 28 trap
- 30 talc
- 32 method of the present invention including an additional element
- 34 method of the present invention including an additional element

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

FIG. 1 is an illustrative view showing the creation of the poultry litter 12 as the manure 14 from a chicken 18 mixes with bedding 16. The poultry litter 12 is then placed into an extruder 20 where it is processed into poultry litter bait plugs 22 which are used as bait for fish 24 and other such marine life.

FIG. 2 is a flow chart demonstrating the method of the present invention 10 wherein the poultry litter 12 is selected and inserted into the extruder 20 where it is pushed through constrictions and ground into smaller pieces where heat is generated by a combination of friction and pressure inside the extruder. Moisture is driven off in the form of steam which destroys any existing pathogens. The poultry litter 12 is then extruded by being forced through at least one tube and is pelletized as it exits therefrom by the severing of the segments as they pass through.

Figure 3:
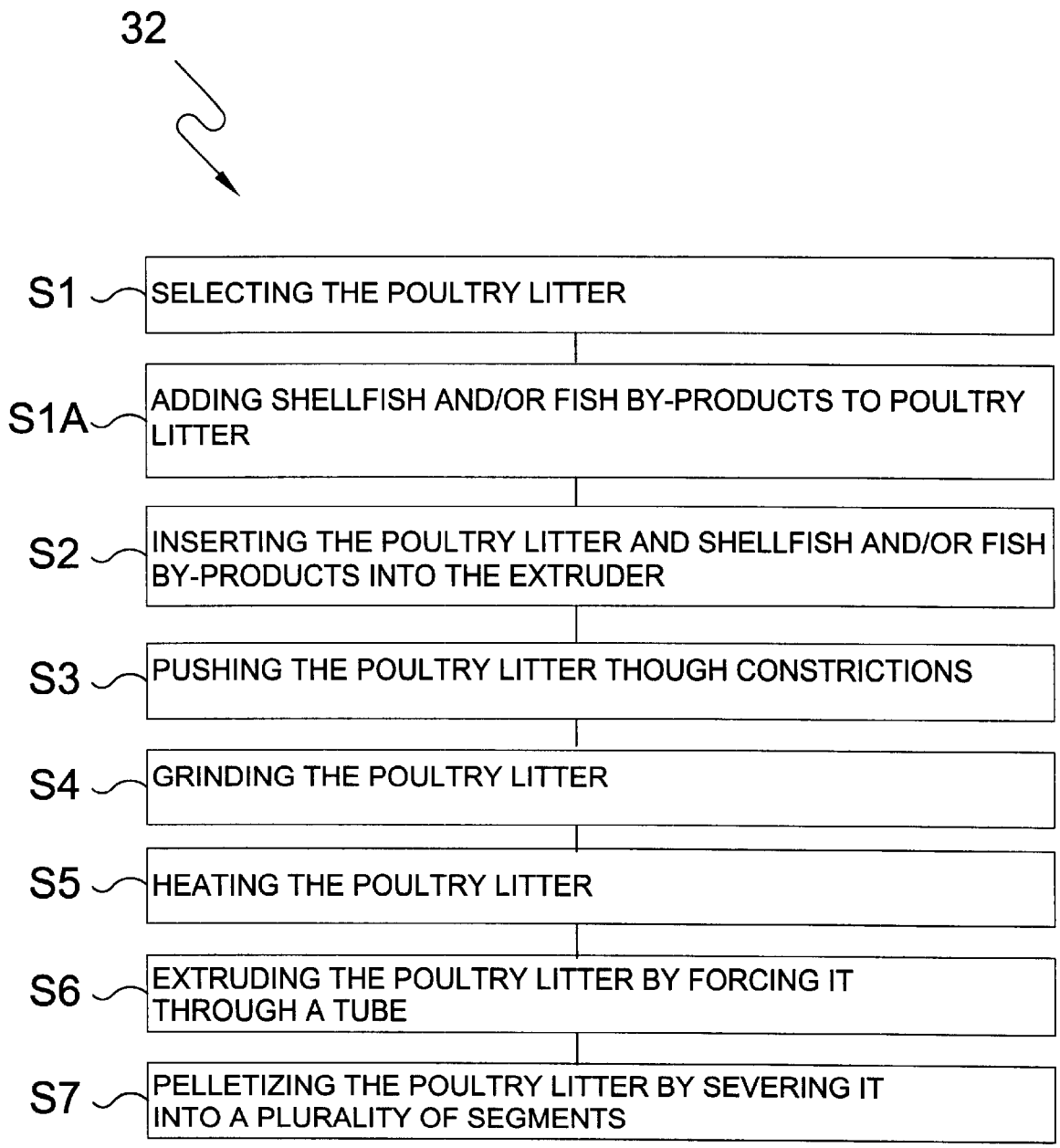
FIG. 3 is a flow chart of the method of the present invention including fish by-products and/or animal or vegetable products mixed with the poultry litter.

FIG. 3 is a flow chart demonstrating the method of the present invention including an additional element 32 wherein the poultry litter 12 is selected and combined with fish by-products 26 and other materials and inserted into the extruder 20 where it is pushed through constrictions and ground into smaller pieces, creating steam which destroys any existing pathogens. The poultry litter 12 is then extruded by being forced through at least one tube and is pelletized as it exits therefrom by the severing of the segments as they pass through.

Figure 4:
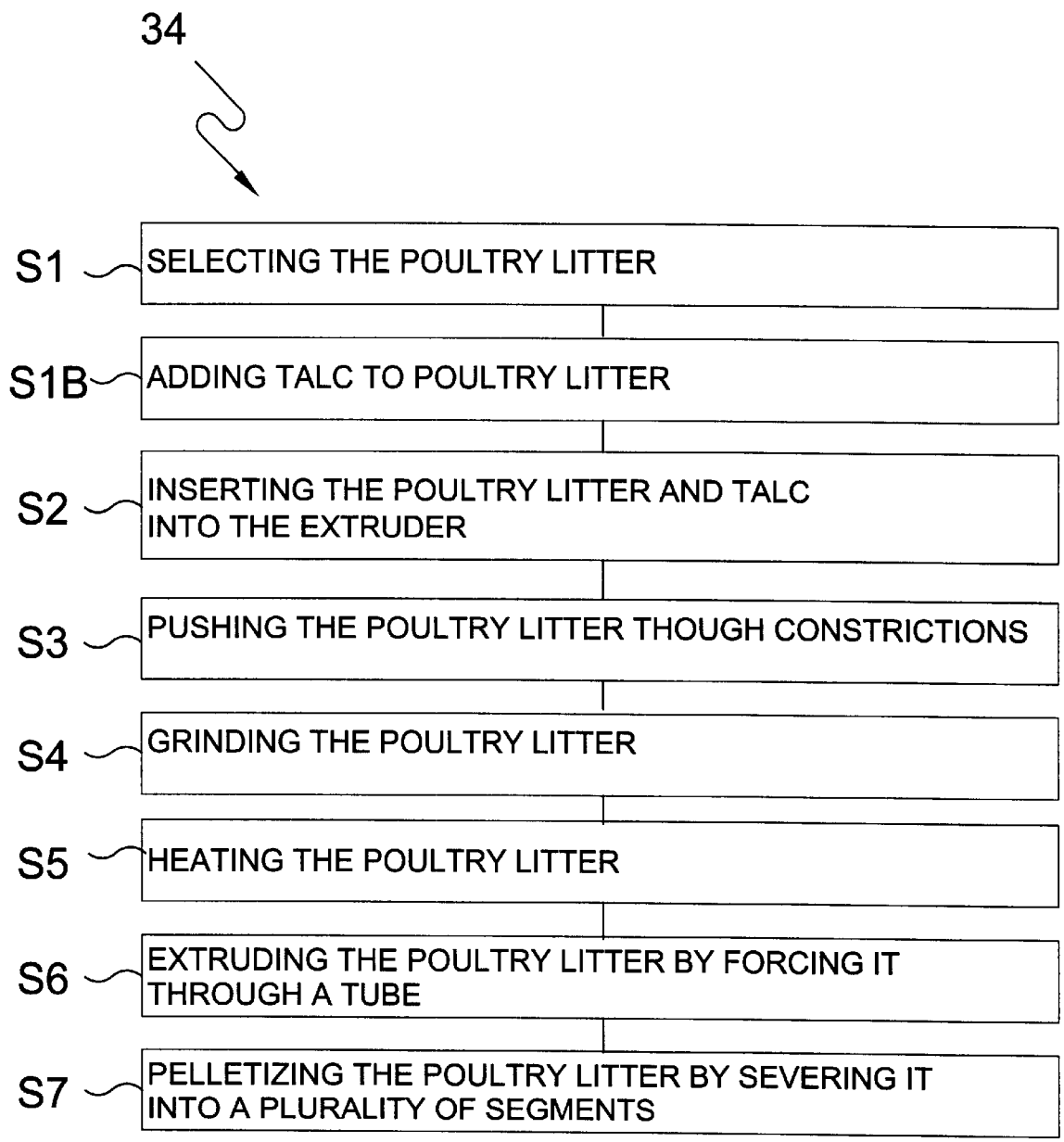
FIG. 4 is a flow chart of the method of the present invention including talc mixed with the poultry litter.

FIG. 4 is a flow chart demonstrating the method of the present invention including an additional element 34 wherein the poultry litter 12 is selected and combined with talc 30 and inserted into the extruder 20 where it is pushed through constrictions and ground into smaller pieces thus creating steam which destroys any existing pathogens. The poultry litter 12 is then extruded by being forced through at least one tube and is pelletized as it exits therefrom by the severing of the segments as they pass through.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A method for extruding poultry litter for use as feed or bait for marine life which comprises:
    a) selecting the poultry litter to be processed;
    b) inserting the poultry litter into the extruder
    c) pushing the poultry litter through constrictions under pressure;
    d) grinding the poultry litter into particular matter;
    e) heating the poultry litter through the friction and pressure inside the extruder to a temperature of no less than 200 degrees Fahrenheit for a predetermined period of time;
    f) extruding the poultry litter by forcing it through at least one tube having a predetermined diameter; and
    g) pelletizing the poultry litter by severing said poultry litter into a plurality of segments as it advances beyond the distal end of said tube.

2. A method for extruding poultry litter for use as feed or bait for marine life as recited in claim 1, further including mixing fish by-products to said poultry litter prior to the insertion of said poultry litter into said extruder.

3. A method for extruding poultry litter for use as feed or bait for marine life as recited in claim 1, further including mixing fish by-products to said poultry litter inside of said extruder.

4. A method for extruding poultry litter for use as feed or bait for marine life as recited in claim 1, further including mixing shellfish by-products to said poultry litter inside of said extruder.

5. A method for extruding poultry litter for use as feed or bait for marine life as recited in claim 1, further including mixing talc to said poultry litter to increase the density of the material produced.

6. A method for extruding poultry litter for use as feed or bait for marine life as recited in claim 1, further including mixing any combination of talc, shellfish and fish by products to said poultry litter to increase the density of the material produced.

7. A method for extruding poultry litter for use as feed or bait for marine life as recited in claim 1, further including mixing fish by-products and other materials to said poultry litter prior to the insertion of said poultry litter into said extruder.

8. A method for extruding poultry litter for use as feed or bait for marine life as recited in claim 1, further including mixing fish by-products and other materials to said poultry litter inside of said extruder.

9. A method for extruding poultry litter for use as feed or bait for marine life as recited in claim 1, further including mixing any combination of talc, shellfish, fish by products and other materials to said poultry litter to increase the density of the material produced.

* * * * *